(12) United States Patent
Yokota (10) Patent No.: US 8,503,398 B2
(45) Date of Patent: Aug. 6, 2013

(54) RADIO COMMUNICATION SYSTEM, RADIO COMMUNICATION TERMINAL AND COMMUNICATION CONTROLLING METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 90 days.

(21) Appl. No.: 13/259,853

(22) PCT Filed: Mar. 25, 2010

(86) PCT No.: PCT/JP2010/055284
§ 371 (c)(1),
(2), (4) Date: Nov. 8, 2011

(87) PCT Pub. No.: WO2010/110394
PCT Pub. Date: Sep. 30, 2010

(65) Prior Publication Data
US 2012/0046067 A1    Feb. 23, 2012

(30) Foreign Application Priority Data
Mar. 26, 2009   (JP) .................. 2009-077837

(51) Int. Cl.
*H04W 4/00* (2009.01)
*H04W 36/00* (2009.01)

(52) U.S. Cl.
USPC ......................................... 370/331; 455/436

(58) Field of Classification Search
None
See application file for complete search history.

(56) References Cited

U.S. PATENT DOCUMENTS

| 2007/0025297 | A1* | 2/2007 | Lee et al. | 370/331 |
| 2008/0198804 | A1* | 8/2008 | Rahman et al. | 370/331 |
| 2009/0161629 | A1* | 6/2009 | Purkayastha et al. | 370/331 |
| 2010/0274900 | A1* | 10/2010 | Javaid et al. | 709/226 |
| 2012/0051326 | A1* | 3/2012 | Yokota | 370/331 |

FOREIGN PATENT DOCUMENTS

| JP | 2000-270015 A | 9/2000 |
| JP | 2004-272563 A | 9/2004 |
| JP | 2008-211568 A | 9/2008 |
| JP | 2008-236125 A | 10/2008 |
| JP | 2009-027227 A | 2/2009 |

OTHER PUBLICATIONS

Notification of Reasons for Refusal dated Sep. 18, 2012, issued in counterpart Japanese Application No. 2011-506127.
Enhance radio network connectivity and maintain a Quality of IP service application, 21-08-0201-00-0000-experimental-results-proposal, IEEE mentor. Jul. 15, 2008 Kyocera Yokohama R&D Center.
Qiaobing Xie et al. Definition and enhancements to MIH Link Parameter Change Primitive, 21-06-0467-00-0000, IEEE 802 LAN/MAN Standards Committee. Jan. 9, 2006.

(Continued)

*Primary Examiner* — Clemence Han
(74) *Attorney, Agent, or Firm* — Procopio, Cory, Hargreaves & Savitch LLP (57) ABSTRACT

A video streaming client (105) transmits an MIH_Get_Service_Quality.request which requests a report about service quality which is used in the video streaming client (105) at regular intervals to an MIHF (Media Independent Handover Function) (203). When the MIHF (203) acquires the MIH_Get_Service_Quality.request, on the basis of the communication quality of a radio link which is notified from a link control unit (205), the MIHF (203) calculates a prediction value of the service quality in the future in the regular intervals and notifies the video streaming client (105) of the calculated prediction value by an MIH_Get_Service_Quality.response.

10 Claims, 5 Drawing Sheets

(56) References Cited

OTHER PUBLICATIONS

International Search Report and Written Opinion dated Jun. 8, 2010 issued by the Japanese Patent Office for International Application No. PCT/JP2010/055284.

IEEE P802.21/D04.00 "Draft Standard for Local and Metropolitan Area Networks: Media Independent Handover Services", LAN MAN Standards Committee of the IEEE Computer Society, Feb. 2007.

* cited by examiner

MIH_Get_Service_Quality.request (
        Sourceidentifier,
        DestinationIdentifier,
        Service_Quality,
        Report_Period
        )

Parameters

FIG. 7

MIH_Get_Service_Quality.response (
        Sourceidentifier,
        DestinationIdentifier,
        Service_Quality,
        Report_Period
        )

Parameters

FIG. 8

RADIO COMMUNICATION SYSTEM, RADIO COMMUNICATION TERMINAL AND COMMUNICATION CONTROLLING METHOD

TECHNICAL FIELD

The present invention relates to a radio communication system, a radio communication terminal and a communication controlling method which perform handover from a first radio communication network to a second radio communication network employing a radio communication method different from that of the first radio communication network.

BACKGROUND ART

The recent advancement of radio communication technology has led to implementation of a radio communication system between a mobile communication terminal (Mobile Node), which is capable of establishing connection to multiple radio communication networks employing different radio communication methods, or a mobile router and a mobile communication terminal (Mobile Network Node), which is connected to the mobile router and is joining a mobile network.

Such radio communication system includes: an MIH user (Media Independent Handover User, mobility manager) configured to administrate mobility between multiple radio communication networks; and multiple link controllers each configured to establish a radio link with any one of the radio communication networks.

Proposal has been made to include an MIH function (Media Independent Handover Function, handover controller) between an MIH user and multiple link controllers in such radio communication system capable of establishing connection to multiple radio communication networks, the MIH function being configured to control handover between the radio communication networks, i.e., inter-system handover (non-patent document 1, for example).

In addition, the inventor of the present application has already proposed the following method. In the method, when an MIH function is provided between an MIH user and a link controller, the MIH user notifies the MIH function of a service quality request value, which is a request value of service quality (QoS) in the MIH user (including an upper entity such as a communication application, where a protocol stack of layer 3 or above is also included and an example is a handover manager for handling TCP, UDP, policy or the like), and then the MIH function sets a communication quality threshold of a radio link, in the link controller, the communication quality threshold being associated with the service quality request value notified from the MIH user.

By using such method, when being notified that the communication quality of the radio link has reached the communication quality threshold, by the link controller, the MIH function notifies the MIH user that the communication quality has reached the service quality request value corresponding to the communication quality threshold. Accordingly, the MIH user can quickly decide to change the service quality request value or to perform handover.

PRIOR ART DOCUMENT

Non-Patent Document

Non-patent document 1: IEEE P802.21/D04.00 Draft IEEE Standard for Local and Metropolitan Area Networks: Media Independent Handover Services, LAN MAN Standards Committee of the IEEE Computer Society

SUMMARY OF THE INVENTION

However, the above-described proposal has the following problem. Specifically, every time the communication quality reaches the service quality request value corresponding to the communication quality threshold, the MIH function notifies the MIH user that the communication quality has reached the service quality request value, which increases processing load of the MIH user.

Moreover, the MIH function notifies the MIH user that the communication quality of the radio link has reached the service quality request value corresponding to the communication quality threshold after being notified that the communication quality has reached the communication quality threshold by the link controller. Accordingly, a certain delay inevitably occurs during the time between when the communication quality of the radio link has reached the communication quality threshold and when the MIH user performs corresponding processing. This means that the communication quality of the radio link may have already changed when the MIH user performs the corresponding processing. In such case, another problem arises that processing appropriate for the communication quality of the radio link (for example, handover, or adaptive control of the application or TCP parameters (buffer, regeneration rate, encoding rate, encoding method, congestion window, transmission window and the like) based on the communication quality of the radio link) cannot be performed.

The present invention has been made in view of the above-described situation, and has an objective to provide a radio communication system, a radio communication terminal and a communication controlling method which are capable of performing processing, such as handover or adaptive control of parameters, appropriate for communication quality of a radio link without increasing processing load of an MIH user, when a handover controller such as an MIH function is provided between the MIH user and the link controller.

To solve the above problem, the present invention has following features. First, a first feature of the present invention is summarized as a radio communication system (radio communication system 50) which performs handover from a first radio communication network (radio communication network 10, for example) to a second radio communication network (radio communication network 20, for example) employing a radio communication method different from that of the first radio communication network, including: a link controller (link controller 205) configured to establish a radio link (radio link RL) with the first radio communication network or the second radio communication network; an entity (video streaming client 105, for example) configured to perform communication by using at least one of the first radio communication network and the second radio communication network; and a handover controller (MIH Function 103, MIH Function 203) configured to control handover from the first radio communication network to the second radio communication network on the basis of a request from the entity, wherein the entity transmits a service quality acquisition request (MIH_Get_Service_Quality.request) to the handover controller to request to be reported, at regular intervals, about service quality used by the entity, and when acquiring the service quality acquisition request from the entity, the handover controller calculates a prediction value of future service quality at the regular intervals on the basis of communication quality of the radio link notified from the link controller, and then reports the calculated prediction value (MIH_Get_Service_Quality.response) to the entity.

In such radio communication system, when acquiring a service quality acquisition request, the handover controller calculates a prediction value of future service quality, and then reports the calculated prediction value to the entity at regular intervals. This avoids a situation where, every time communication quality reaches a service quality request value corresponding to the communication quality threshold of a radio link, the entity (or an MIH user) is notified that the communication quality has reached the service quality request value.

Moreover, a prediction value of future service quality is reported to the entity. With this configuration, even if a certain delay occurs during the time between when communication quality of the radio link has reached the communication quality threshold and when the entity performs corresponding processing, processing (handover or buffer control, for example) appropriate for the prediction value of service quality of the time when the processing is performed can be performed.

Hence, such radio communication system is capable of performing processing, such as handover, appropriate for the communication quality of the radio link without increasing processing load of the entity, when the handover controller is provided between the entity and the link controller.

A second feature of the present invention is summarized as a radio communication system (mobile communication terminal 100A) which performs handover from a first radio communication network (radio communication network 10, for example) to a second radio communication network (radio communication network 20, for example) employing a radio communication method different from that of the first radio communication network, including: a link controller (link controller 205) configured to establish a radio link (radio link RL) with the first radio communication network or the second radio communication network; a mobility manager (MIH User 109A, for example) configured to manage mobility of the radio communication system from the first radio communication network to the second radio communication network; and a handover controller (MIH function 103) configured to control handover from the first radio communication network to the second radio communication network on the basis of a request from the mobility manager, wherein the mobility manager transmits a service quality acquisition request (MIH_Get_Service_Quality.request) to the handover controller to request to be reported, at regular intervals, about service quality used by the mobility manager, and when acquiring the service quality acquisition request from the mobility manager, the handover controller calculates a prediction value of future service quality at the regular intervals on the basis of communication quality of the radio link notified from the link controller, and then reports the calculated prediction value (MIH_Get_Service_Quality.response) to the mobility manager.

A third feature of the present invention according to the first feature or the second feature of the present invention is summarized as that the entity is an MIH user which is defined in IEEE802.21, and the handover controller is an MIH function which is defined in the IEEE802.21.

A fourth feature of the present invention according to the second feature of the present invention is summarized as that the mobility manager is an MIH user which is defined in IEEE802.21, and the handover controller is an MIH function which is defined in the IEEE802.21.

A fifth feature of the present invention is summarized as a radio communication terminal which performs handover from a first radio communication network to a second radio communication network employing a radio communication method different from that of the first radio communication network, including: a link controller configured to establish a radio link with the first radio communication network or the second radio communication network; an entity configured to perform communication by using at least one of the first radio communication network and the second radio communication network; and a handover controller configured to control handover from the first radio communication network to the second radio communication network on the basis of a request from the entity, wherein the entity transmits a service quality acquisition request to the handover controller to request to be reported, at regular intervals, about service quality used by the entity, and when acquiring the service quality acquisition request from the entity, the handover controller calculates a prediction value of future service quality at the regular intervals on the basis of communication quality of the radio link notified from the link controller, and then reports the calculated prediction value to the entity.

A sixth feature of the present invention is summarized as a radio communication terminal which performs handover from a first radio communication network to a second radio communication network employing a radio communication method different from that of the first radio communication network, including: a link controller configured to establish a radio link with the first radio communication network or the second radio communication network; a mobility manager configured to manage mobility of a radio communication system from the first radio communication network to the second radio communication network; and a handover controller configured to control handover from the first radio communication network to the second radio communication network on the basis of a request from the mobility manager, wherein the mobility manager transmits a service quality acquisition request to the handover controller to request to be reported, at regular intervals, about service quality used by the mobility manager, and when acquiring the service quality acquisition request from the mobility manager, the handover controller calculates a prediction value of future service quality at the regular intervals on the basis of communication quality of the radio link notified from the link controller, and then reports the calculated prediction value to the mobility manager.

A seventh feature of the present invention according to the fifth feature of the present invention is summarized as that the entity is an MIH user which is defined in IEEE802.21, and the handover controller is an MIH function which is defined in the IEEE802.21.

An eighth feature of the present invention according to the sixth feature of the present invention is summarized as that the mobility manager is an MIH user which is defined in IEEE802.21, and the handover controller is an MIH function which is defined in the IEEE802.21.

A ninth feature of the present invention is summarized as a communication controlling method for performing handover from a first radio communication network to a second radio communication network employing a radio communication method different from that of the first radio communication network, comprising the steps of: establishing a radio link with the first radio communication network or the second radio communication network; running an entity by using at least one of the first radio communication network and the second radio communication network; and controlling handover from the first radio communication network to the second radio communication network on the basis of a request from the entity, wherein the step of running the entity includes the step of transmitting a service quality acquisition request which requests a report to be made, at regular intervals, about service quality used by the entity, and the step of controlling handover includes the step of calculating a prediction value of future service quality at the regular intervals on the basis of communication quality of the radio link, when acquiring the service quality acquisition request from the entity, and then reporting the calculated prediction value to the entity.

A tenth feature of the present invention is summarized as a communication controlling method for performing handover from a first radio communication network to a second radio communication network employing a radio communication method different from that of the first radio communication network, comprising the steps of: establishing a radio link with the first radio communication network or the second radio communication network; managing mobility of the radio communication system from the first radio communication network to the second radio communication network, by a mobility manager; and controlling handover from the first radio communication network to the second radio communication network on the basis of processing performed in the step of managing mobility, wherein the step of managing mobility includes the step of transmitting a service quality acquisition request which requests a report to be made, at regular intervals, about service quality used by the mobility manager, and the step of controlling handover includes the step of calculating a prediction value of future service quality at the regular intervals on the basis of communication quality of the radio link, when acquiring the service quality acquisition request, and then reporting the calculated prediction value to the mobility manager.

According to the present invention, provided are a radio communication system, a radio communication terminal and a communication controlling method which are capable of performing processing, such as handover or adaptive control of parameters, appropriate for communication quality of a radio link without increasing processing load of an MIH user, when a handover controller such as an MIH function is provided between the MIH user and the link controller.

MODES FOR CARRYING OUT THE INVENTION

Next, an embodiment of the present invention will be described. Specifically, descriptions will be given of (1) a schematic configuration of an entire communication network, (2) a functional block configuration of a radio communication system, (3) operations of the radio communication system, (4) advantages and effects, and (5) alternative embodiments.

Note that, throughout the following descriptions of the drawings, the same or similar parts bear the same or similar reference numerals. It should be noted, however, that the drawings are schematic, and that the dimensional proportions and the like are different from their actual values.

Accordingly, specific dimensions and the like should be inferred based on the descriptions given below. Moreover, dimensional relationships and dimensional proportions may differ from one drawing to another in some parts.

(1) Schematic Configuration of Entire Communication Network

Figure 1:
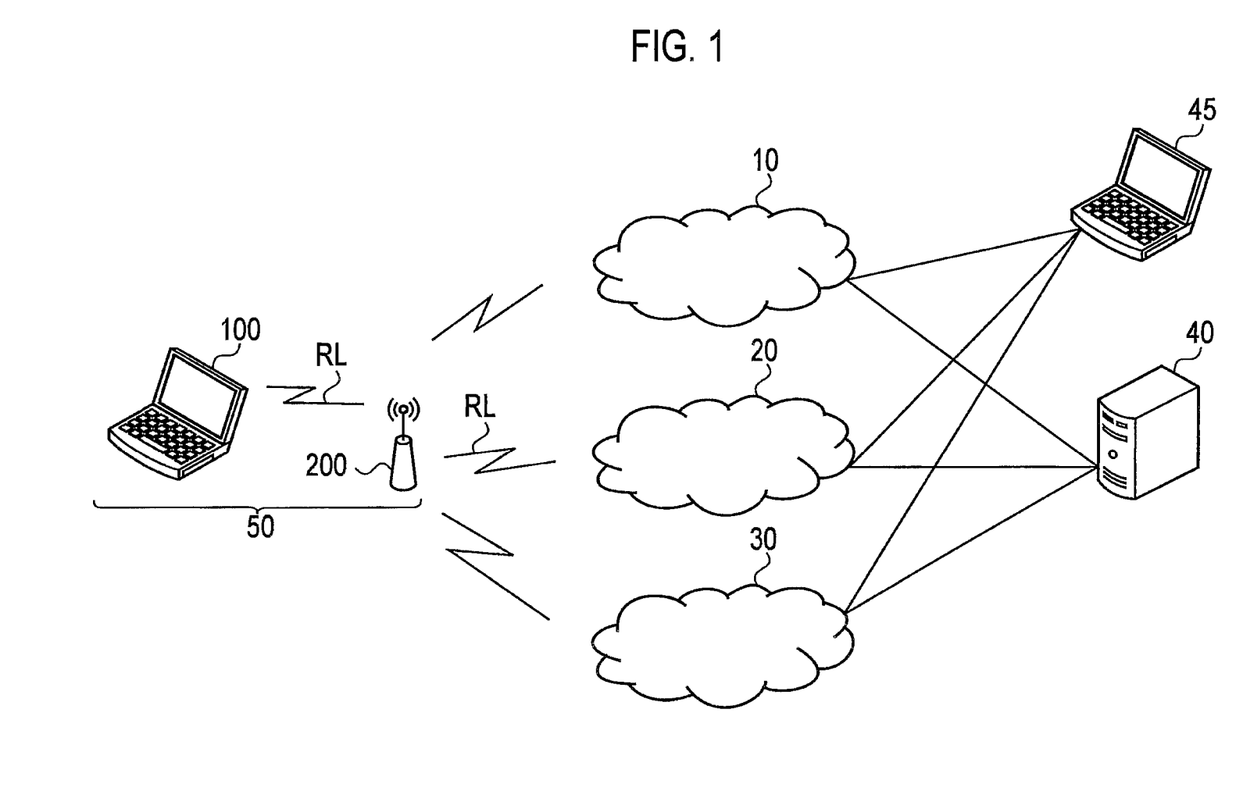
FIG. 1 is a schematic configuration diagram of an entire communication network according to an embodiment of the present invention.

FIG. 1 is a schematic configuration diagram of an entire communication network according to this embodiment. The communication network according to this embodiment includes a radio communication network 10, a radio communication network 20 and a radio communication network 30. The radio communication network 10 is based on CDMA 2000 1xEV-DO. In this embodiment, the radio communication network 10 serves as a first radio communication network. The radio communication network 20 is based on MBWA (iBurst (registered trademark)) standardized under IEEE802.20. In this embodiment, the radio communication network 20 serves as a second radio communication network. The radio communication network 30 is based on mobile WiMAX standardized under IEEE802.16e. Accordingly, the radio communication networks 10 to 30 employ different radio communication methods (media), respectively.

Wired connection is established between each of the radio communication networks 10 to 30 and each of a video streaming server 40 and a CN 45 (Corresponding Node). In addition, radio connection is established between each of the radio communication networks 10 to 30 and a mobile router 200.

The mobile router 200 establishes a radio link RL with each of the radio communication networks 10 to 30 and a mobile communication terminal 100.

The video streaming server 40 and the CN 45 run communication applications with the mobile communication terminal 100. The video streaming server 40 runs a video streaming application on the basis of a request from the mobile communication terminal 100, and then broadcasts streaming data to the mobile communication terminal 100. The CN 45 and the mobile communication terminal 100 run a TV phone application using VoIP or the like, thereby providing TV phone service between the CN 45 and the mobile communication terminal 100.

The mobile communication terminal 100 and the mobile router 200 are mobile. The mobile communication terminal 100 is carried by a user or the like of the mobile communication terminal 100. The mobile router 200 is installed in a mobile space such as a railroad vehicle. In this embodiment, the mobile communication terminal 100 and the mobile router 200 establish a radio communication system 50.

The radio communication system 50 implements Media Independent Handover Function (MIHF) defined in IEEE802.21, in order to perform seamless handover between the radio communication networks 10 to 30 employing the different radio communication methods (media). In addition, the video streaming server 40 is also capable of implementing MIHF.

(2) Functional Block Configuration of Radio Communication System

Figure 2:
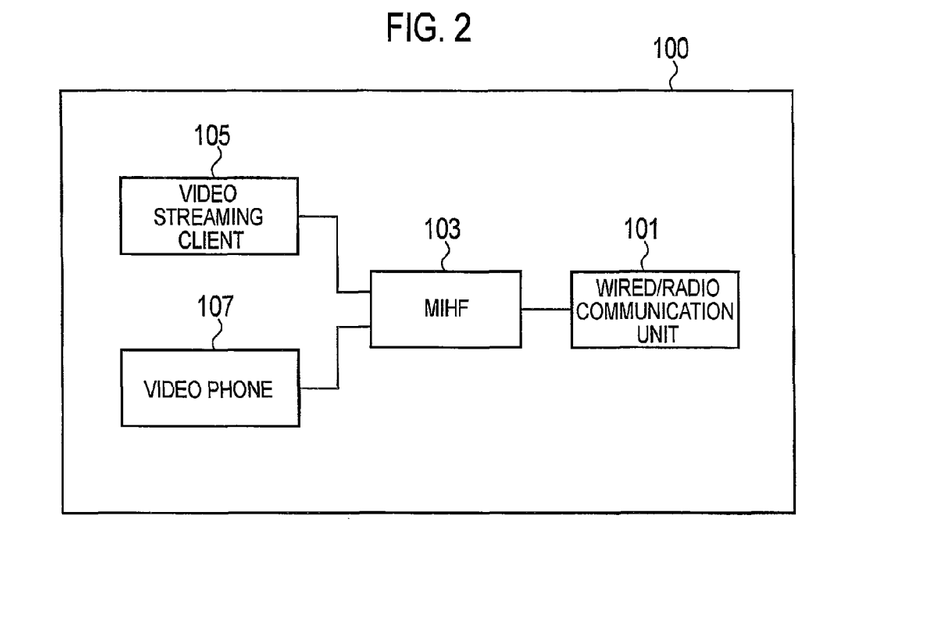
FIG. 2 is a functional block diagram of a mobile communication terminal 100 according to the embodiment of the present invention.
Figure 3:
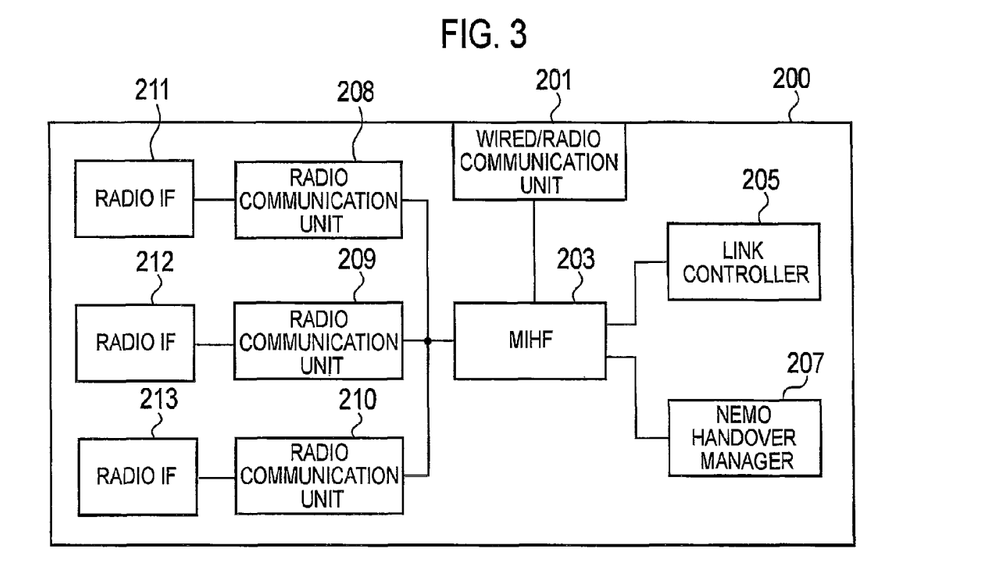
FIG. 3 is a functional block diagram of a mobile router 200 according to the embodiment of the present invention.

Next, descriptions will be given of functional block configurations of the mobile communication terminal 100 and the mobile router 200 establishing the radio communication system 50. FIG. 2 is a functional block diagram of the mobile communication terminal 100. FIG. 3 is a functional block diagram of the mobile router 200.

(2.1) Mobile Communication Terminal 100

As shown in FIG. 2, the mobile communication terminal 100 includes a wired/radio communication unit 101, an MIH function 103 (MIHF 103, below), a video streaming client 105 and a video phone 107.

The wired/radio communication unit 101 is configured to perform wired or radio communication with a wired/radio communication unit 201 of the mobile router 200. As a radio communication method between the mobile communication terminal 100 and the mobile router 200, WLAN standardized under IEEE802.21 may be used, for example.

The MIHF 103 is configured to control handover between the radio communication networks on the basis of a request from any one of the video streaming client 105 and the video phone 107, which are configured to function as upper layers of the MIHF 103. The MIHF 103 is configured to assist in adaptively controlling parameters in accordance with communication qualities of the radio links RL between the mobile router 200 and the radio communication networks 10 to 30. In this embodiment, the MIHF 103 serves as a handover controller.

The MIHF 103 is MIHF function (MIHF) defined in IEEE802.21. In other words, the MIHF 103 is a set of multiple essential functions necessary for handover between radio communication networks employing different radio communication methods (heterogeneous media). Moreover, the MIHF 103 is configured to organically link an upper protocol stack of the layer 3 to a protocol of the layer 1/layer 2 across layers.

The MIHF 103 is between an upper entity, specifically, a communication application such as the video streaming client 105 or the video phone 107, i.e., an entity, and a link controller 205 (see FIG. 3) included in the mobile router 200 in this embodiment, and is configured, for example, to relay various commands to the link controller 205, the commands being transmitted from the entity and related to handover, and relay events and the like transmitted from the link controller 205, to the entity.

The video streaming client 105 and the video phone 107 are configured to perform communication by using any one of or some of the radio communication networks 10 to 30. The video streaming client 105 is configured to perform processing for receiving video streaming data broadcasted from the video streaming server 40. The video phone 107 is configured to run a TV phone application using VoIP or the like, with the CN 45, thereby providing TV phone service.

The video streaming client 105 and the video phone 107 (referred to as entities in short below when appropriate) are each configured to transmit MIH_Get_Service_Quality.request (service quality acquisition request) to an MIH function 203 (see FIG. 3) of the mobile router 200, the request requesting to be reported, every certain period (100 ms, for example), about the quality of service used by the entity.

Figure 6:
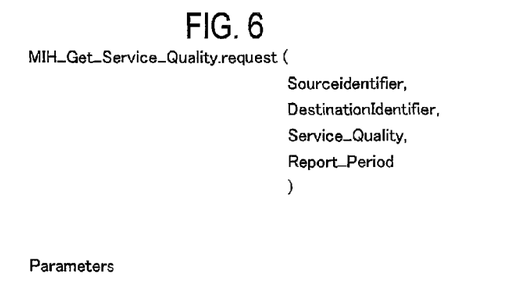
FIG. 6 is a view showing a format of MIH_Get_Service_Quality.request according to the embodiment of the present invention.

FIG. 6 shows a format of MIH_Get_Service_Quality.request. Further, Table 1 and Table 2 show the contents of parameters included in MIH_Get_Service_Quality.request.

TABLE 1

| Name | Data Type | Description |
| --- | --- | --- |
| SourceIdentifier | MIH_User_ID | This identifies MIH_USER that will be the source of this request. |
| DestinationIdentifier | MIHF_ID | This identifies local or remote MIHF that will be the destination of this request. |
| Service_Quality1 | Service_Quality_REQ1 | Predicted Service Quality1 |
| Service_Quality2 | Service_Quality_REQ2 | Predicted Service Quality2 |
| Report_Period | INTEGER | Period to be reported (ms unit) |

TABLE 2

| Data Type name | Derived from | Definition |
| --- | --- | --- |
| Service_Quality_REQ1 | UNSIGNED_INT(1) | Predicted Available Band Width request from now to next report. |
| Service_Quality_REQ2 | UNSIGNED_INT(1) | Predicted delay for Uplink and Downlink |

In the present embodiment, the entity corresponds to MIH user defined in the IEEE 802.21. As shown in Table 1, MIH_Get_Service_Quality.request includes source and destination identifiers (SourceIdentifier, DestinationIdentifier, request service qualities (Service_Quality1, Service_Quality2) and report period (Report_Period). Moreover, as shown in Table 2, predicted available band width (uplink and downlink) or predicted delay (uplink and downlink) is used as the type of the request service quality.

For example, predicted available band width can be used for changing streaming encoding or the like, while predicted delay can be used for changing VoIP encoding rate, packet size or the like. Thus, the mobile communication terminal 100 can perform appropriate adaptive control.

(2.2) Mobile Router 200

As shown in FIG. 3, the mobile router 200 includes a wired/radio communication unit 201, an MIH function 203

(MIHF 203, below), a link controller 205, an NEMO handover manager 207, radio communication units 208 to 210 and radio IFs 211 to 213.

The wired/radio communication unit 201 is configured to perform wired or radio communication with the wired/radio communication unit 101 of the mobile communication terminal 100.

The MIHF 203, as the MIHF 103, is configured to control handover between radio communication networks on the basis of a request from any one of the video streaming client 105 and the video phone 107, which are configured to function as upper layers of the MIHF 203. In addition, the MIHF 203 is configured to assist in adaptively controlling parameters in accordance with communication qualities of the radio links RL between the mobile router 200 and the radio communication networks 10 to 30. In this embodiment, the MIHF 203 serves as a handover controller. The MIHF 203 is MIH function (MIHF) defined in IEEE802.21.

Moreover, the MIHF 203 acquires service quality acquisition request (MIH_Get_Service_Quality.request) which requests to be reported, every certain period, about the quality of service (QoS) used by the entity, from the entity. Acquiring the service quality acquisition request, the MIHF 203 calculates a prediction value of the future service quality every certain period, on the basis of the communication qualities of the radio links RL reported from the link controller 205.

Specifically, the MIHF 203 acquires DRC (Data Rate Control) value of each radio link RL. The DRC value is the class of a transmission rate (modulation method) determined on the basis of receiving SINR of the radio link RL established between the mobile router 200 and each of the radio communication networks 10 to 30. The MIHF 203 generates a table which associates each acquired DRC with the actual transmission rate (throughput).

Subsequently, the MIHF 203 counts the number of slots allocated to data transmission of the entity in a predetermined time period (T1) (allocated slot number), and then calculates a slot allocation rate on the basis of the allocated slot number in relation to the total number of slots in T1. Further, the MIHF 203 calculates the maximum value (or the average value) of the slot allocation rates in a past predetermined time period (T2). Here, T2 is usually set longer than T1 as in the case of setting T2=5T1, for example.

The MIHF 203 multiplies the transmission rate associated with the current DRC and the maximum value (or the average value) of the slot allocation rate together. The MIHF 203 uses the multiplication result as a prediction value of the service quality (transmission rate).

The MIHF 203 notifies the entity which has transmitted the service quality acquisition request, of the obtained prediction value by means of MIH_Get_Service_Quality.response.

Figure 7:
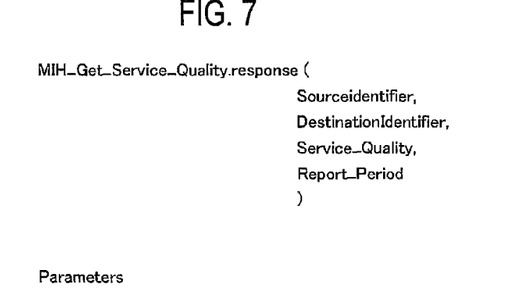
FIG. 7 is a view showing a format of MIH_Get_Service_Quality.response according to the embodiment of the present invention.

FIG. 7 shows a format of MIH_Get_Service_Quality.response. Further, Table 3 and Table 4 show the contents of parameters included in MIH_Get_Service_Quality.response.

TABLE 3

| Name | Data Type | Description |
|---|---|---|
| SourceIdentifier | MIHF_ID | This identifies local or remote MIHF that will be the source of this request. |
| DestinationIdentifer | MIH_USER | This identifies MIH_USER that will be the destination of this request. |
| Service_Quality1 | Service_Quality_Value1 | Predicted Service Quality1 |
| Service_Quality2 | Service_Quality_Value2 | Predicted Service Quality2 |
| Report_Period | INTEGER | Period to be reported (ms unit) |

TABLE 4

| Data Type name | Derived from | Definition |
|---|---|---|
| Service_Quality_Value1 | UNSIGNED_INT(1) | Predicted Available Band Width value in kbps unit from now to next report. |
| Service_Quality_Value2 | UNSIGNED_INT(1) | Predicted delay for Uplink and Downlink. |

As shown in Table 3, MIH_Get_Service_Quality.response includes source and destination identifiers (SourceIdentifier, DestinationIdentifier), predicted service qualities (Service_Quality1, Service_Quality2) and report period (Report_Period). Moreover, as shown in Table 4, predicted available band width (uplink and downlink) or predicted delay (uplink and downlink) is used as the type of the predicted service quality.

The link controller 205 is configured to control the radio communication units 208 to 210 in accordance with an instruction from the MIHF 203, and to establish a radio link RL through each of the radio IFs 211 to 213 corresponding respectively to the radio communication networks 10 to 30. Specifically, the link controller 205 performs an interface (device driver) function for the radio communication units 208 to 210, and establishes a radio link RL corresponding to the radio communication method employed by each of the radio communication networks. Further, the link controller 205 is configured to acquire information indicating communication qualities of the radio links RL established for the radio communication networks, from the radio communication units 208 to 210.

The NEMO handover manager 207 is configured to manage mobility of the mobile router 200 (and the mobile communication terminal 100). Specifically, the NEMO handover manager 207 performs processing necessary for securing IP mobility of the mobile router 200, in accordance with Network Mobility (NEMO) Basic Support Protocol (RFC 3963).

The radio communication units 208 to 210 respectively include modules corresponding to the radio communication networks 10 to 30, and are configured to perform radio communication through the radio IFs 211 to 213 corresponding respectively to the radio communication networks 10 to 30, in accordance with an instruction from the link controller 205.

(3) Operations of Radio Communication System

Next, descriptions will be given of operations of the above-described radio communication system 50 (the mobile communication terminal 100 and the mobile router 200).

(3.1) Operation Example 1

Figure 4:
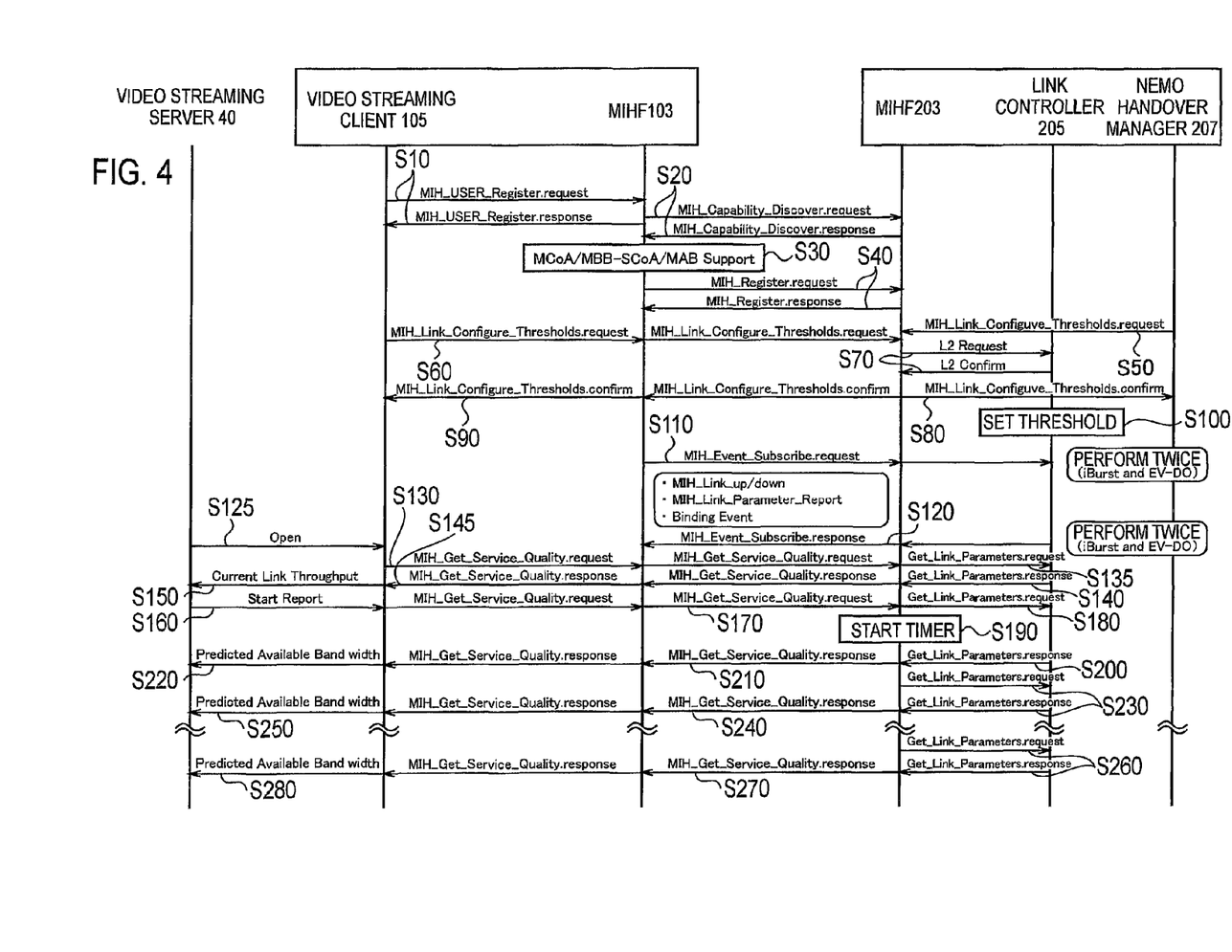
FIG. 4 is a view showing Operation Example 1 of a radio communication system 50 in acquiring a prediction value of service quality, according to the embodiment of the present invention.

FIG. 4 shows Operation Example 1 of the radio communication system 50 in acquiring a prediction value of service quality (transmission rate or delay).

As shown in FIG. 4, in Step S10, the video streaming client 105 transmits MIH_USER_Register.request to the MIHF 103 to request registration as an MIH user. On the basis of received MIH_USER_Register.request, the MIHF 103 transmits MIH_USER_Register.response to the video streaming client 105, MIH_USER_Register.response showing that the video streaming client 105 is registered as an MIH user. Here, MIH_USER_Register.request and MIH_USER_Register.response are not defined in IEEE802.21, but are newly defined.

In Step S20, the MIHF 103 transmits MIH_Capability_Discover.request to the MIHF 203 to inquire of the MIHF 103 about whether or not there exists any radio communication network (radio link RL) with which handover between radio communication networks employing different radio communication methods (heterogeneous media) can be performed. On the basis of the inquiry, the MIHF 203 transmits MIH_Capability_Discover.response to the MIHF 103 to notify the MIHF 103 of a radio communication network with which media independent handover can be performed.

In Step S30, the MIHF 103 performs preparation for media independent handover (MIH) on the basis of the result notified from the MIHF 203. Specifically, the MIHF 103 performs preparation for lossless handover which uses Multiple Care of Address (MCoA) (Make Before Break) or handover which uses Single Care of Address (SCoA) (Make After Break or Make Before Break).

In Step S40, the MIHF 103 transmits MIH_Register.request to the MIHF 203 to request registration of the MIH. On the basis of received MIH_Register.request, the MIHF 203 transmits MIH_Register.response indicating that the MIHF 103 is registered, to the video streaming client 105. Note that MIH_Register.request and MIH_Register.response are not defined in IEEE802.21, but are newly defined.

In Step S50, the NEMO handover manager 207 notifies the MIHF 203 of the threshold of service quality of the mobile router 200 (MIH_Link_Configure_Threshold.request). Then, in Step S60, the video streaming client 105 notifies the MIHF 203 of the threshold of service quality used by the video streaming client 105 (MIH_Link_Configure_Threshold.request).

In Step S70, the MIHF 203 requests to establish a logical link in the layer 2, and the link controller 205 transmits confirmation of the request to the MIHF 203 in response.

In Step S80, as a response to the MIH_Link_Configure_Threshold.request from the NEMO handover manager 207, the MIHF 203 transmits MIH_Link_Configure_Threshold.confirm to the NEMO handover manager 207. Then, in Step S90, as a response to the MIH_Link_Configure_Threshold.request from the video streaming client 105, the MIHF 203 transmits MIH_Link_Configure_Threshold.confirm to the video streaming client 105.

In Step S100, on the basis of the logical link establishment request from the MIHF 203, the link controller 205 sets the thresholds of the service of qualities of currently-connected radio communication networks and radio communication networks to be handover candidates.

In Step S110, the MIHF 103 transmits MIH_Event_Subscribe.request to the MIHF 203 and the link controller 205 to request to be notified of events related to the MIH. The events include MIH_Link_up/down, MIH_Link_Parameters_Report, Binding Event and the like. This process is performed the number of times corresponding to that of the currently-connected radio communication networks and the radio communication networks to be handover candidates. In this embodiment, the radio communication network 10 (1xEV-DO) and the radio communication network 20 (iBurst (registered trademark)) are considered as these radio communication networks.

In Step S120, as a response to MIH_Event_Subscribe.request, the link controller 205 transmits MIH_Event_Subscribe.response to the MIHF 103 and the MIHF 203. Here, this process is also performed the number of times corresponding to that of the currently-connected radio communication networks and the radio communication networks to be handover candidates.

In Step S125, starting communicating with the video streaming client 105, the video streaming server 40 requests to be notified of the current transmission rate (throughput) in the downlink.

In Step S130, the video streaming client 105 transmits MIH_Get_Service_Quality.request to the MIHF 203 through the MIHF 103 to request to be reported, every certain period, the quality of service used by the video streaming client 105. Here, the format of MIH_Get_Service_Quality.response is as shown in Table 1 and Table 2.

In Step S135, the MIHF 203 transmits Get_Link_Parameters.request to the link controller 205 to request to be reported of link parameters of the currently-connected radio communication networks. In Step S140, the link controller 205 transmits Get_Link_Parameters.response to the MIHF 203 to notify link parameters of the radio communication networks.

In Step S145, on the basis of the link parameters transmitted from the link controller 205 and including DRC and SINR, the MIHF 203 transmits MIH_Get_Service_Quality.response to the video streaming client 105 to notify current service quality (transmission rate). Here, the format of MIH_Get_Service_Quality.response is as shown in Table 3 and Table 4.

In Step S150, the video streaming client 105 notifies the video streaming server 40 of the current transmission rate, specifically, the throughput.

In Step S160, the video streaming server 40 acquires the notified current transmission rate, and requests the video streaming client 105 to periodically report service quality.

In Step S170, on the basis of the request for periodic report of service quality, the video streaming client 105 transmits MIH_Get_Service_Quality.request to the MIHF 203.

In Step S180, the MIHF 203 transmits Get_Link_Parameters.request to the link controller 205. Then, in Step S190, the MIHF 203 starts a timer for timing the period (certain period) for reporting the service quality. In other words, the MIHF 203 starts the timer for noticing the timings for transmitting Get_Link_Parameters.request and MIH_Get_Service_Quality.response. Note that the period for reporting the quality of service (100 ms, for example) may be changed appropriately depending on the throughputs or the like of the mobile communication terminal 100 and the mobile router 200.

In Step S200, the link controller 205 transmits Get_Link_Parameters.response to the MIHF 203. In Step S210, the MIHF 203 transmits MIH_Get_Service_Quality.response to the video streaming client 105.

In Step S220, the video streaming client 105 reports the service quality (predicted available band width or throughput) included in MIH_Get_Service_Quality.response received from the MIHF 203, to the video streaming client 105.

The process in Steps S180 and S200 to S220 described above is thereafter repeated in Steps S230 to S280 at regular intervals.

(3.2) Operation Example 2

Figure 5:
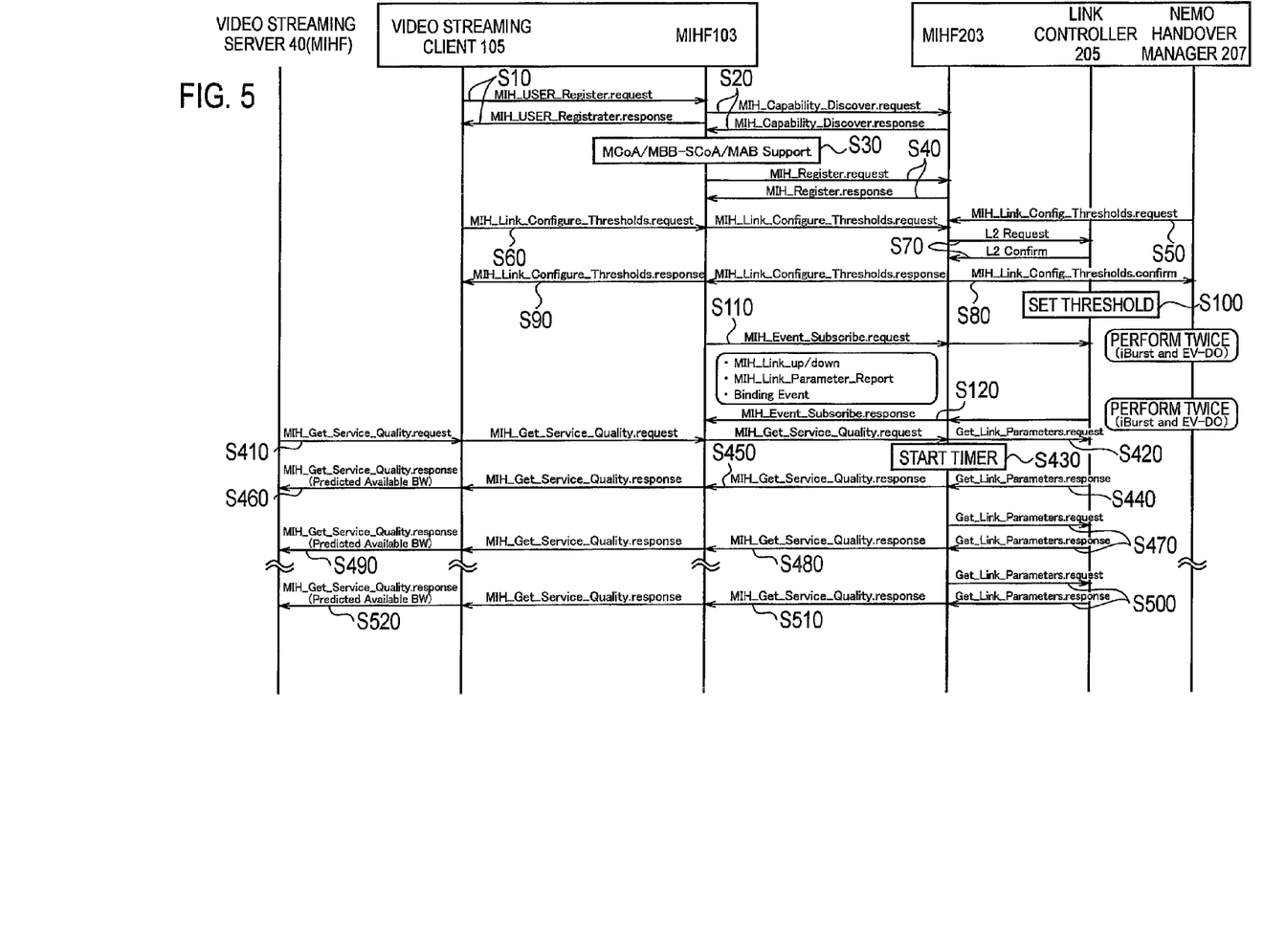
FIG. 5 is a view showing Operation Example 2 of a radio communication system 50 in acquiring a prediction value of service quality, according to the embodiment of the present invention.

FIG. 5 shows Operation Example 2 of the radio communication system 50 in acquiring a prediction value of service quality (transmission rate or delay). In this example, the difference, compared to Operation Example 1 described above, is that the video streaming server 40 also includes an MIHF.

The process in Steps S10 to S120 is the same as that of Operation Example 1 shown in FIG. 4. In Step S410, the video streaming server 40 transmits MIH_Get_Service_Quality.request to the video streaming client 105, and then the video streaming client 105 transmits MIH_Get_Service_Qaulity.request to the MIHF 103 and the MIHF 203.

In Step S420, the MIHF 203 transmits Get_Link_Parameters.request to the link controller 205. Then, in Step S430, the MIHF 203 starts a timer for timing the period for reporting the service quality.

The process in Steps S440 and S450 is the same as Steps S200 and S210 of Operation Example 1.

In Step S460, the video streaming client 105 relays MIH_Get_Service_Quality.response received from the MIHF 203, to the MIHF of the video streaming server 40.

The process in Steps S420 and S440 to S460 described above is thereafter repeated in Steps S470 to S520 at regular intervals.

(4) Effects and Advantages

By employing the radio communication system 50, when receiving MIH_Get_Service_Quality.request, the MIHF 203 calculates a prediction value of future service quality, and then reports, every certain period, the calculated prediction value to the entity (the video streaming client 105 or the video phone 107) by means of MIH_Get_Service_Quality.response. This avoids a situation where, every time communication quality reaches a service quality request value corresponding to the communication quality threshold of a radio link RL, the entity is notified that the communication quality has reached the service quality request value.

Moreover, a prediction value of future service quality is reported to the entity. With this configuration, even if a certain delay occurs during the time between when communication quality of the radio link RL has reached the communication quality threshold and when the entity performs corresponding processing, processing (handover or adaptive control of parameters, for example) appropriate for the prediction value of service quality of the time when the processing is performed can be performed.

Accordingly, when the MIHF 103 and the MIHF 203 are provided between each entity and the link controller 205, the radio communication system 50 can perform handover or adaptive control of parameters appropriate for communication quality of the radio link RL without increasing processing load of the entity.

(5) Alternative Embodiments

The essence of the present invention has been disclosed by using an embodiment of the present invention as described above. However, the descriptions and drawings forming part of this disclosure should not be considered to limit the present invention. Various alternative embodiments can be apparent to those skilled in the art from this disclosure.

For example, an MIHF is included in each of the mobile communication terminal 100 and the mobile router 200, or each of the video streaming server 40, the mobile communication terminal 100 and the mobile router 200, in the above-described embodiment. However, such an alternative is also possible that an MIHF is only provided in the mobile communication terminal 100 and an MIH user is employed instead of an entity.

Figure 8:
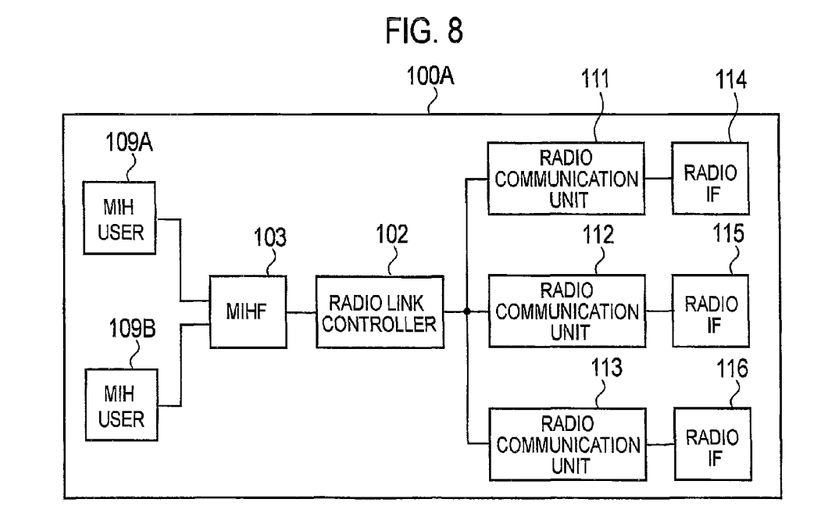
FIG. 8 is a functional block diagram of a mobile communication terminal 100A according to a modification of the present invention.

FIG. 8 is a functional block diagram of a mobile communication terminal 100A (radio communication terminal) according to a modification of the present invention. As shown in FIG. 8, the mobile communication terminal 100A includes a radio link controller 102, an MIHF 103, MIH Users 109A and 109B, radio communication units 111 to 113 and radio IFs 114 to 116. In the following, descriptions will be mainly given of aspects different from the above-described mobile communication terminal 100.

The radio communication units 111 to 113 perform respectively radio communication with radio communication networks 10 to 30 through radio IFs 114 to 116. This means that the mobile communication terminal 100A accesses the radio communication networks 10 to 30 without using a mobile router 200.

On the basis of an instruction from the MIHF 103, the radio link controller 102 controls the radio communication units 111 to 113, and thereby establishes a radio link RL with any one of the radio communication networks 10 to 30.

The MIH User 109A and the MIH User 109B manage the mobility of the mobile communication terminal 100A from the radio communication network 10 to the radio communication network 20, for example. In this modification, the MIH User 109A and the MIH User 109B serve as mobility managers. The MIH User 109A and the MIH User 109B are MIH users defined in IEEE802.21. The MIH User 109A and the MIH User 109B are Mobile IP protocols, for example.

The MIH User 109A and the MIH User 109B, as the above-described entities (the video streaming client 105 and the video phone 107), transmit MIH_Get_Service_Quality.request to the MIHF 103. On the basis of the request from the MIH User 109A or the MIH User 109B, the MIHF 103 adaptively controls handover to a different radio communication network or a parameter.

In the above-described embodiment, descriptions are given by using a prediction value of downlink service quality as an example. However, such a case is also possible that a video phone of the CN 45 includes an MIHF and the video phone of the CN 45 calculates a prediction value of uplink service quality.

In the above-described embodiment, descriptions are given by using CDMA200 1xEX-DO, iBurst (registered trademark) and mobile WiMAX as examples. However, radio communication methods to which the present invention is applicable are not limited to those, of course. For example, the present invention is also applicable to LTE (Long Term Evolution) system, which is a next-generation cellular system. As has just been described, it is obvious that the present invention includes various embodiments not described herein.

Note that the entire content of Japanese Patent Application No. 2009-077837 (filed on Mar. 26, 2009) is incorporated herein by reference.

INDUSTRIAL APPLICABILITY

As described above, the present invention is useful for a radio communication such as a mobile communication, since a radio communication system, a radio communication terminal and a communication controlling method are capable of performing processing, such as handover or adaptive control of parameters, appropriate for communication quality of a radio link without increasing processing load of an MIH user, when a handover controller such as an MIH function is provided between the MIH user and the link controller.

The invention claimed is:

1. A radio communication system which performs handover from a first radio communication network to a second radio communication network employing a radio communication method different from that of the first radio communication network, comprising:
    a link controller configured to establish a radio link with the first radio communication network or the second radio communication network;
    an entity configured to perform communication by using at least one of the first radio communication network and the second radio communication network; and
    a handover controller configured to control handover from the first radio communication network to the second radio communication network on the basis of a request from the entity, wherein
    the entity transmits a service quality acquisition request to the handover controller to request to be reported, at regular intervals, about service quality used by the entity, and
    when acquiring the service quality acquisition request from the entity, the handover controller calculates a prediction value of future service quality at the regular intervals on the basis of communication quality of the radio link notified from the link controller, and then reports the calculated prediction value to the entity.

2. The radio communication system according to claim 1, wherein
    the entity is an MIH user which is defined in IEEE802.21, and
    the handover controller is an MIH function which is defined in the IEEE802.21.

3. A radio communication system which performs handover from a first radio communication network to a second radio communication network employing a radio communication method different from that of the first radio communication network, comprising:
    a link controller configured to establish a radio link with the first radio communication network or the second radio communication network;
    a mobility manager configured to manage mobility of the radio communication system from the first radio communication network to the second radio communication network; and
    a handover controller configured to control handover from the first radio communication network to the second radio communication network on the basis of a request from the mobility manager, wherein
    the mobility manager transmits a service quality acquisition request to the handover controller to request to be reported, at regular intervals, about service quality used by the mobility manager, and
    when acquiring the service quality acquisition request from the mobility manager, the handover controller calculates a prediction value of future service quality at the regular intervals on the basis of communication quality of the radio link notified from the link controller, and then reports the calculated prediction value to the mobility manager.

4. The radio communication system according to claim 3, wherein
    the mobility manager is an MIH user which is defined in IEEE802.21, and
    the handover controller is an MIH function which is defined in the IEEE802.21.

5. A radio communication terminal which performs handover from a first radio communication network to a second radio communication network employing a radio communication method different from that of the first radio communication network, comprising:
    a link controller configured to establish a radio link with the first radio communication network or the second radio communication network;
    an entity configured to perform communication by using at least one of the first radio communication network and the second radio communication network; and
    a handover controller configured to control handover from the first radio communication network to the second radio communication network on the basis of a request from the entity, wherein
    the entity transmits a service quality acquisition request to the handover controller to request to be reported, at regular intervals, about service quality used by the entity, and
    when acquiring the service quality acquisition request from the entity, the handover controller calculates a prediction value of future service quality at the regular intervals on the basis of communication quality of the radio link notified from the link controller, and then reports the calculated prediction value to the entity.

6. The radio communication terminal according to claim 5, wherein
    the entity is an MIH user which is defined in IEEE802.21, and
    the handover controller is an MIH function which is defined in the IEEE802.21.

7. A radio communication terminal which performs handover from a first radio communication network to a second radio communication network employing a radio communication method different from that of the first radio communication network, comprising:
    a link controller configured to establish a radio link with the first radio communication network or the second radio communication network;
    a mobility manager configured to manage mobility of the radio communication system from the first radio communication network to the second radio communication network; and
    a handover controller configured to control handover from the first radio communication network to the second radio communication network on the basis of a request from the mobility manager, wherein
    the mobility manager transmits a service quality acquisition request to the handover controller to request to be reported, at regular intervals, about service quality used by the mobility manager, and
    when acquiring the service quality acquisition request from the mobility manager, the handover controller calculates a prediction value of future service quality at the regular intervals on the basis of communication quality of the radio link notified from the link controller, and then reports the calculated prediction value to the mobility manager.

8. The radio communication terminal according to claim 6, wherein
the mobility manager is an MIH user which is defined in IEEE802.21, and
the handover controller is an MIH function which is defined in the IEEE802.21.

9. A communication controlling method for performing handover from a first radio communication network to a second radio communication network employing a radio communication method different from that of the first radio communication network, comprising the steps of:
establishing a radio link with the first radio communication network or the second radio communication network;
running a communication application of an entity by using at least one of the first radio communication network and the second radio communication network; and
controlling handover from the first radio communication network to the second radio communication network on the basis of a request from the entity, wherein
the step of running the communication application includes the step of transmitting a service quality acquisition request which requests a report to be made, at regular intervals, about service quality used by the entity, and
the step of controlling handover includes the step of calculating a prediction value of future service quality at the regular intervals on the basis of communication quality of the radio link, when acquiring the service quality acquisition request from the entity, and then reporting the calculated prediction value to the entity.

10. A communication controlling method for performing handover from a first radio communication network to a second radio communication network employing a radio communication method different from that of the first radio communication network, comprising the steps of:
establishing a radio link with the first radio communication network or the second radio communication network;
managing mobility of a radio communication system from the first radio communication network to the second radio communication network, by a mobility manager; and
controlling handover from the first radio communication network to the second radio communication network on the basis of processing performed in the step of managing mobility, wherein
the step of managing mobility includes the step of transmitting a service quality acquisition request which requests a report to be made, at regular intervals, about service quality used by the mobility manager, and
the step of controlling handover includes the step of calculating a prediction value of future service quality at the regular intervals on the basis of communication quality of the radio link, when acquiring the service quality acquisition request, and then reporting the calculated prediction value to the mobility manager.

* * * * *